(12) United States Patent
Smet et al.

(10) Patent No.: US 7,537,537 B2
(45) Date of Patent: May 26, 2009

(54) PLANETARY GEAR WHEEL CONSTRUCTION

(75) Inventors: Wim Martha Victor Smet, Temse (BE); Warren Gregory Smook, Gauteng (ZA)

(73) Assignee: Hansen Transmissions International, naamloze vennootschap, Edegem (BE)

( * ) Notice: Subject to any disclaimer, the term of this patent is extended or adjusted under 35 U.S.C. 154(b) by 360 days.

(21) Appl. No.: 11/481,894

(22) Filed: Jul. 7, 2006

(65) Prior Publication Data
US 2007/0049448 A1  Mar. 1, 2007

(30) Foreign Application Priority Data
Aug. 31, 2005  (BE) .................................. 2005/0415

(51) Int. Cl.
*F16H 57/04* (2006.01)
*F16H 57/08* (2006.01)
(52) U.S. Cl. ........................ 475/159; 475/346; 184/6.12
(58) Field of Classification Search .................. 475/159, 475/331, 346; 184/6.12
See application file for complete search history.

(56) References Cited

U.S. PATENT DOCUMENTS

| | | | |
|---|---|---|---|
| 2,928,474 A * | 3/1960 | Haworth et al. ......... | 416/157 R |
| 5,107,676 A | 4/1992 | Hadaway et al. | |
| 6,223,616 B1 | 5/2001 | Sheridan | |
| 2008/0006018 A1 * | 1/2008 | Sheridan et al. .............. | 60/39.1 |

FOREIGN PATENT DOCUMENTS

| | | |
|---|---|---|
| EP | 1 319 871 | 6/2003 |
| GB | 671396 | 5/1950 |
| GB | 1130254 | 11/1965 |
| GB | 1172952 | 5/1967 |
| GB | 2 160 291 | 12/1985 |
| GB | 2 366 602 | 3/2002 |
| WO | WO 03/078870 | 9/2003 |

* cited by examiner

*Primary Examiner*—Tisha D Lewis
(74) *Attorney, Agent, or Firm*—Young & Thompson

(57) ABSTRACT

A planetary gear wheel construction with one or several planet wheels which are bearing-mounted on a planet carrier, which is provided in a rotating manner in a housing, and an oil lubrication formed of an oil supply via a ring-shaped channel in the housing formed of a ring-shaped groove and a distribution element turning along with the planet carrier which is rotatably held in the groove, and which is provided with a passage to connect the oil channel to an oil channel in the planet carrier which opens at a planet wheel. The distribution element is coupled to the planet carrier by a loose connection which makes it possible to transmit the rotational movement of the planet carrier to the distribution element, and the oil channel in the planet carrier is connected to the passage in the distribution element by a flexible or moving oil pipe.

10 Claims, 1 Drawing Sheet

PLANETARY GEAR WHEEL CONSTRUCTION

BACKGROUND OF THE INVENTION

1. Field of the Invention

The present invention concerns a planetary gear wheel construction.

In particular, the present invention concerns a planetary gear wheel construction of the type having one or several planetary gears that are bearing-mounted on a planet carrier which is provided in a rotating manner in a housing, and an oil lubrication formed of an oil supply via a ring-shaped channel in the housing which is formed of a ring-shaped groove and a distribution element turning along with the planet carrier held in a rotating manner in said groove and which is provided with a passage to connect said oil channel to an oil channel in the planet carrier opening at a planet wheel.

2. Discussion of the Related Art

Such a gear wheel construction is known for example from document WO 03/078870 in the name of the applicant, whereby the above-mentioned distribution element is connected to a planet carrier in a fixed manner and turns along with this planet carrier in a ring-shaped groove of the housing with a U-shaped section.

The sealing between the ring-shaped distribution element and the ring-shaped groove is realized in the above-mentioned example by means of a labyrinth structure.

A disadvantage of this known gear wheel construction is that the sealing between the rotating distribution element and the stationary groove in the housing is very critical and can easily fail.

This is caused, among others, as sufficient play has to be provided between the rotating distribution element and the housing so as to absorbe small alignment errors during the mounting process as well as manufacturing tolerances.

The same disadvantage occurs in case of gear wheel constructions that are dimensioned such that large tensions in the gear wheel construction due to large loads are absorbed thanks to the flexibility of the gear wheel construction, such that deformations occur under the influence of the loads which have to be absorbed by the above-mentioned play.

SUMMARY OF THE INVENTION

The present invention aims to remedy one or several of the above-mentioned and other disadvantages.

To this end, the present invention concerns a planetary gear wheel construction of the above-mentioned type, whereby the distribution element is coupled to the planet carrier via a loose connection which allows to transmit the rotational movement of the planet carrier to the distribution element, and whereby the oil channel in the planet carrier is connected to the passage in the distribution element by means of a flexible or moving oil pipe.

An advantage of such a gear wheel construction according to the invention is that there is less risk for the sealing between the distribution element and the groove in the housing to fail, as one only has to provide a very small play between the distribution element and the groove in the housing, such that it becomes possible for both parts to move in relation to each other.

The reason therefore is that, thanks to the loose connection between the planet carrier and the distribution element, small alignment errors between the planet carrier and the housing, as well as tolerance differences, can be absorbed by a play at the loose connection between the planet carrier and the distribution element, and no longer by a play between the groove in the housing and the distribution element.

This is advantageous in that the sealing between the parts that rotate in relation to each other, in particular the distribution element and the groove in the housing, can be finished much more accurately, so that smaller pressure losses and minimal leakages can be obtained.

On the other hand, it is far easier to absorb the play between the distribution element and the planet carrier with a flexible or moving oil pipe, as these parts only move in relation to each other to a very small degree.

According to a preferred embodiment of a gear wheel construction according to the invention, the flexible or moving oil pipe is provided in an oil channel provided in the shafts of the planet wheels.

An advantage of this embodiment is that the distance which the oil has to cover through the planet carrier in order to reach the bearing of the planet wheels is restricted, so that less pressure losses occur.

BRIEF DESCRIPTION OF THE DRAWINGS

In order to better explain the characteristics of the invention, the following preferred embodiments of a planetary gear wheel construction according to the invention are described as an example only, without being limitative in any way, with reference to the accompanying drawings, in which.

DESCRIPTION OF THE PREFERRED EMBODIMENTS

Figure 1:
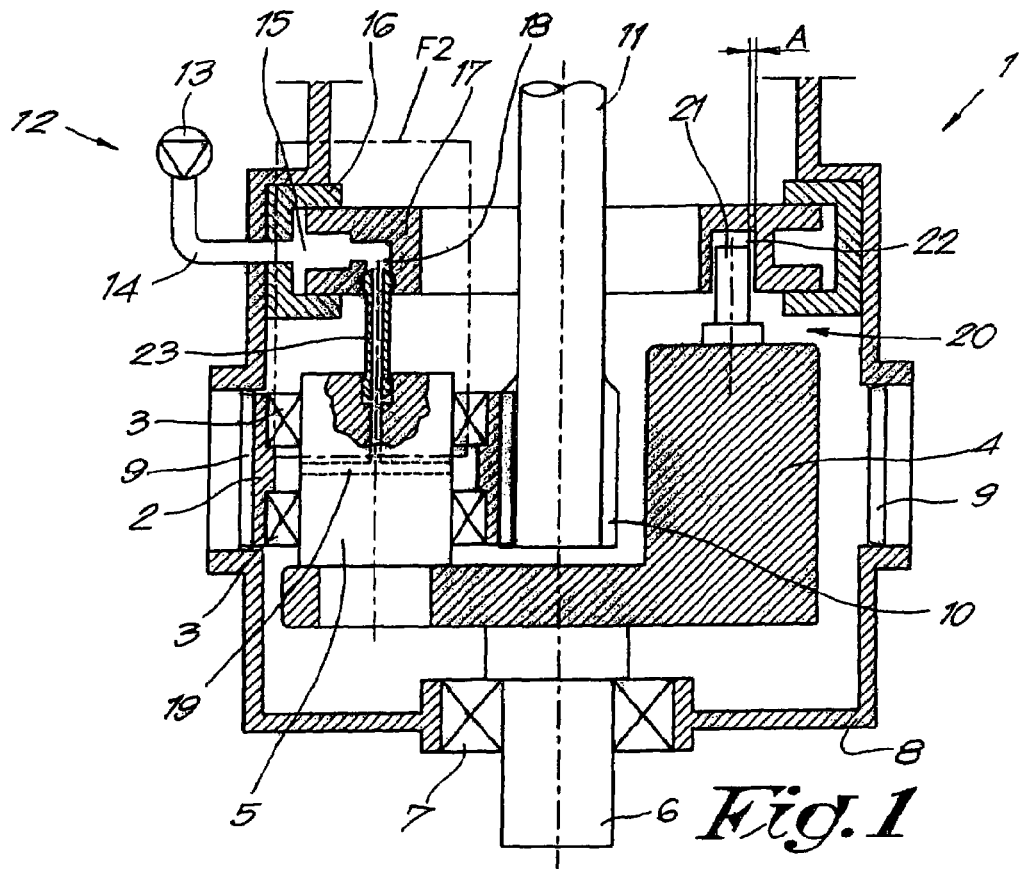
FIG. 1 schematically represents a section of a planetary gear wheel construction according to the invention.

The planetary gear wheel construction 1 according to the invention represented in FIG. 1 is provided with one or several planet wheels 2 provided in a rotating manner on a planet carrier 4 by means of bearings 3, in particular on shafts 5 mounted on the planet carrier 4.

The planet carrier 4 itself is mounted on a shaft 6 which is also provided in a rotating manner in a housing 8 by means of a bearing 7, and which serves for example as an ingoing shaft 6 which rotates relatively slowly.

The planet wheels 2 work in conjunction with a ring wheel with an inner toothing 9 which is in this case fixed to the housing 8 on the one hand, and with a sun wheel 10 mounted on a shaft 11 on the other hand, which shaft 11 serves for example as an outgoing shaft 11 and rotates relatively fast in relation to the ingoing shaft 6.

For the lubrication of the bearings 3 of the planet wheels 2, the planetary gear wheel construction 1 is also provided with an oil lubrication 12 formed of an oil pump 13 which supplies oil via an oil pipe 14 to a ring-shaped channel 15 in the housing 8 which is formed of a ring-shaped groove 16 and a ring-shaped distribution element 17 rotating along with the planet carrier 4 which is held in said groove 16 in a rotating manner and which is provided with a passage 18 to connect this oil channel 15 to an oil channel 19 in the planet carrier 4 which opens at a planet wheel 2.

In the given example, the oil channel 19 in the planet carrier 4 is provided in the shafts 5 bearing the planet wheels 2.

The distribution element 17 is sealed in relation to the housing 8, for example by a sealing in the shape of a labyrinth structure or by any other sealing whatsoever with which the outflow of oil between the housing 8 and the distribution element 17 can be restricted or even prevented.

The distribution element 17 is connected to the planet carrier 4 via a loose connection 20 which makes it possible to transmit the rotational movement of the planet carrier 4 to the distribution element 17.

In the given example, this loose connection 20 is formed of a pin 21 provided on the planet carrier 4 and which is provided with a loose fit in a hole 22 of the distribution element 17.

A play A is thereby provided between the pin 21 and the hole 22, such that a loose connection 20 is effectively obtained, so that alignment errors between the planet carrier 4 and the housing 8 as well as tolerance errors of the parts concerned can be absorbed.

Further, the passage 18 in the distribution element 17 is connected to the oil channel 19 in the shaft 5 of the planet wheel 2 by means of a moving oil pipe 23, whereby this moving oil pipe 23 is axially or almost axially directed.

Figure 2:
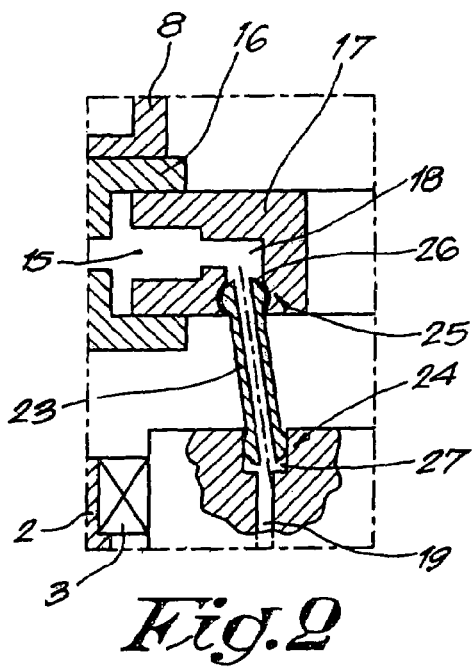
FIG. 2 represents a detail of the part represented in FIG. 1 by F2 to a larger scale, but in a somewhat different position.

As is represented in greater detail in FIG. 2, this moving oil pipe 23 is a rigid oil pipe 23 which is held in a moving manner by its far ends 24 and 25 in the oil channel 19 of the planet carrier 4 and the passage 18 of the distribution element 17 respectively.

The rigid oil pipe 23 is such that both far ends 24 and 25 can rotate in relation to the planet carrier 4 and the distribution element 17, while at least one of both far ends 24 or 25 can move in the axial direction as well in relation to the planet carrier 4 and the distribution element 17, without any oil leaks occurring.

In the given example of FIG. 2, this is realized in that both far ends 24 and 25 have a spherical finish so to say, whereby the far end 25 is held in a spherical recess 26 in the distribution element 17 as a sort of ball joint, and whereby the other far end 24 is made spherical as well and is held in a cylindrical recess 27 in the planet carrier 4.

In order to prevent leakages at these far ends 24 and 25, the above-mentioned far ends can be made of a sealing material for example, such as rubber or the like, or separate sealings may be provided.

The working of the planetary gear wheel construction 1 according to the invention, in particular the working of the lubrication of the bearings 3 of the planet wheels 2 is simple and as follows.

In order to lubricate the bearings 3, oil is supplied by the oil pump 13 via the oil pipe 14 to the ring-shaped channel 15 in the housing 8.

This oil further finds its way via the passage 18 in the distribution element 17 and via the moving oil pipe 23 to the oil channel 19 in the planet carrier 4 to finally reach the bearings 3 carrying the planet wheels 2.

It is clear that alignment errors between the planet carrier 4 and the housing 8, as well as tolerance differences in the parts concerned can be compensated for by a relative movement of the planet carrier 4 in relation to the distribution element 17.

This relative movement is made possible as the connection between the planet carrier 4 and the distribution element 17 is a loose connection 20.

On the other hand, the moving oil pipe 23, as explained above, is such that the planet carrier 4 can move in relation to the distribution element 17 without any oil leaks being created as a result thereof.

This is all very advantageous in that the distribution element 17 can be provided with only a very limited play in the groove 16 of the housing 8, such that a better sealing is obtained at this critical point between the parts that move in relation to each other.

Figure 3:
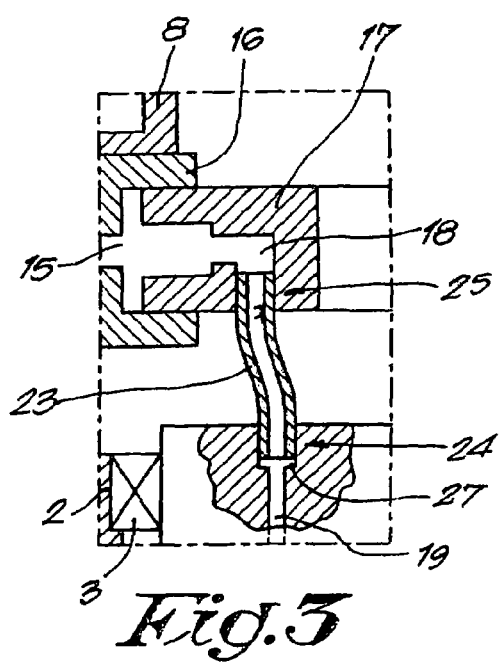
FIG. 3 represents a view as in FIG. 2, but for another embodiment of the gear wheel construction.

FIG. 3 represents another embodiment of a planetary gear wheel construction 1 according to the invention, whereby the oil pipe 23 between the distribution element 17 and the planet carrier 4 is not made rigid but flexible in this case, such that, analogously to the preceding embodiment, small movements between the planet carrier 4 and the distribution element 17 can be absorbed.

In the given example, both far ends 24 or 25 of the oil pipe 23 can be axially moved in relation to the planet carrier 4 and the distribution element 17, without any oil leaks occurring as a result thereof.

As an alternative, for example, the far ends 24 and 25 may also be fixed to the planet carrier 4 and the distribution element 17, such that the entire movement of the planet carrier 4 in relation to the distribution element 17 is absorbed by the flexibility of the oil pipe 23.

The invention is by no means restricted to the embodiment given as an example and represented in the accompanying drawings; on the contrary, such a planetary gear wheel construction can be made in different shapes and dimensions while still remaining within the scope of the invention.

The invention claimed is:

1. A planetary gear wheel construction with one or several planet wheels which are bearing-mounted on a planet carrier, which is provided in a rotating manner in a housing, and an oil lubrication which is formed of an oil supply via a ring-shaped channel in the housing formed of a ring-shaped groove and a distribution element turning along with the planet carrier, the ring-shaped distribution element being held in said groove such that the ring-shaped distribution element can rotate, and the ring-shaped distribution element being provided with a passage to connect said ring-shaped oil channel to an oil channel in the planet carrier which opens at a planet wheel, wherein the distribution element is coupled to the planet carrier by means of a loose connection which makes it possible to transmit the rotational movement of the planet carrier to the distribution element, and in that the oil channel in the planet carrier is connected to the passage in the distribution element by means of a flexible or moving oil pipe.

2. The planetary gear wheel construction according to claim 1, wherein the flexible or moving oil pipe is connected to an oil channel situated in the shafts of the planet wheels.

3. The planetary gear wheel construction according to claim 1, wherein the moving or flexible oil pipe is axially directed.

4. The planetary gear wheel construction according to claim 1, wherein the moving or flexible oil pipe is held in a movable manner in the oil channel of the planet carrier or in the passage of the distribution element with at least one of its far ends.

5. The planetary gear wheel construction according to claim 4, wherein at least one of the far ends of the moving oil pipe can rotate in relation to the planet carrier or the distribution element.

6. The planetary gear wheel construction according to claim 4, wherein at least one of the far ends of the moving oil pipe can be axially moved in relation to the planet carrier or the distribution element.

7. The planetary gear wheel construction according to claim 4, wherein at least one of the far ends has a spherical finish and is held as a sort of ball joint in a spherical recess or cylindrical recess in the distribution element or in the planet carrier.

8. The planetary gear wheel construction according to claim 1, wherein at the far ends of the oil pipe is provided a sealing in the planet carrier of the distribution element.

9. The gear wheel construction according to claim 1, wherein the loose connection between the distribution element and the planet carrier is formed of a pin which is provided on the planet carrier and which is provided with a loose fit in a hole of the distribution element.

10. The gear wheel construction according to claim 1, wherein the distribution element is ring-shaped.

* * * * *